(No Model.) 2 Sheets—Sheet 1.

A. G. WISEMAN.
CLOCK SYNCHRONIZER.

No. 391,446. Patented Oct. 23, 1888.

Attest:
G. N. Hinchman Jr.
Charles Pickles.

Inventor:
Arthur G. Wiseman
by C. D. Moody
atty.

(No Model.) 2 Sheets—Sheet 2.
A. G. WISEMAN.
CLOCK SYNCHRONIZER.
No. 391,446. Patented Oct. 23, 1888.
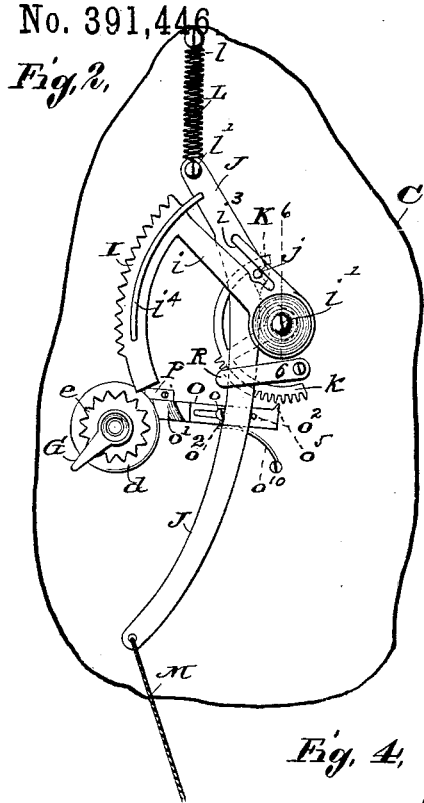
Fig. 2.
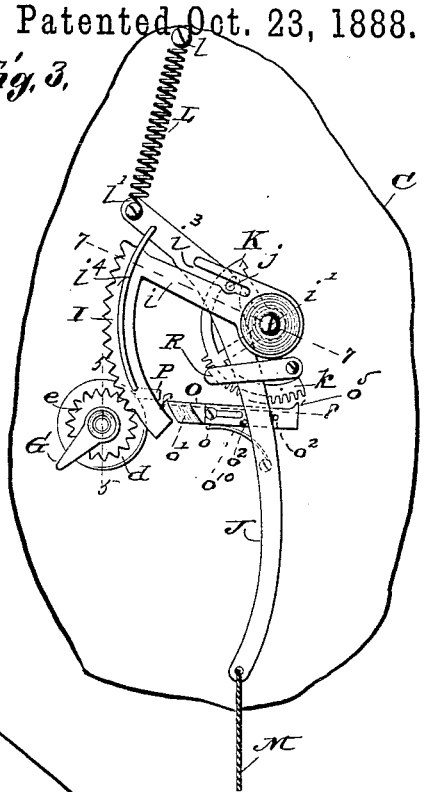
Fig. 3.
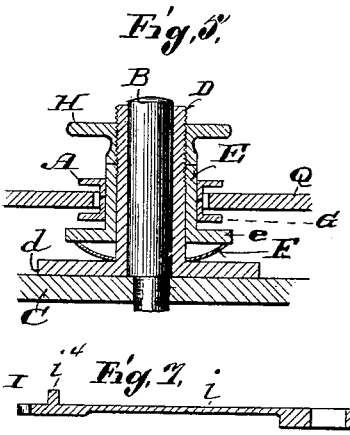
Fig. 5.
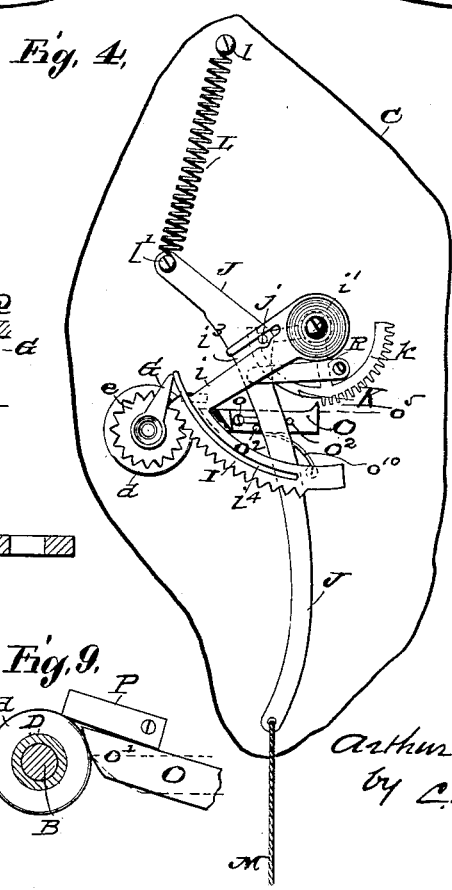
Fig. 4.
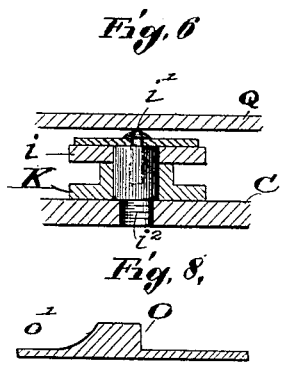
Fig. 6.
Fig. 7.
Fig. 8.
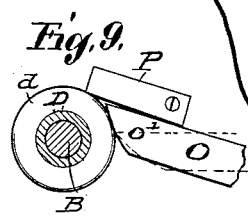
Fig. 9.
Attest:
G. N. Hinchman Jr.
Charles Pickles,
Inventor:
Arthur G. Wiseman
by C. D. Moody.
atty.

UNITED STATES PATENT OFFICE.

ARTHUR G. WISEMAN, OF WEBSTER GROVES, MISSOURI.

CLOCK-SYNCHRONIZER.

SPECIFICATION forming part of Letters Patent No. 391,446, dated October 23, 1888.

Application filed May 24, 1888. Serial No. 274,943. (No model.)

*To all whom it may concern:*

Be it known that I, ARTHUR G. WISEMAN, of Webster Groves, St. Louis county, Missouri, have made a new and useful Improvement in Clock-Synchronizers, of which the following is a full, clear, and exact description.

This improvement has for its object the regulation of the seconds-hand of the clock. By means of it the seconds-hand can at once substantially, and without interfering substantially with the ordinary mechanism of the clock, be turned to point to any desired mark—say the sixty-seconds mark—upon the seconds-graduation, substantially as is hereinafter set forth and claimed, aided by a reference to the annexed drawings, making part of this specification, in which—

Figure 1:
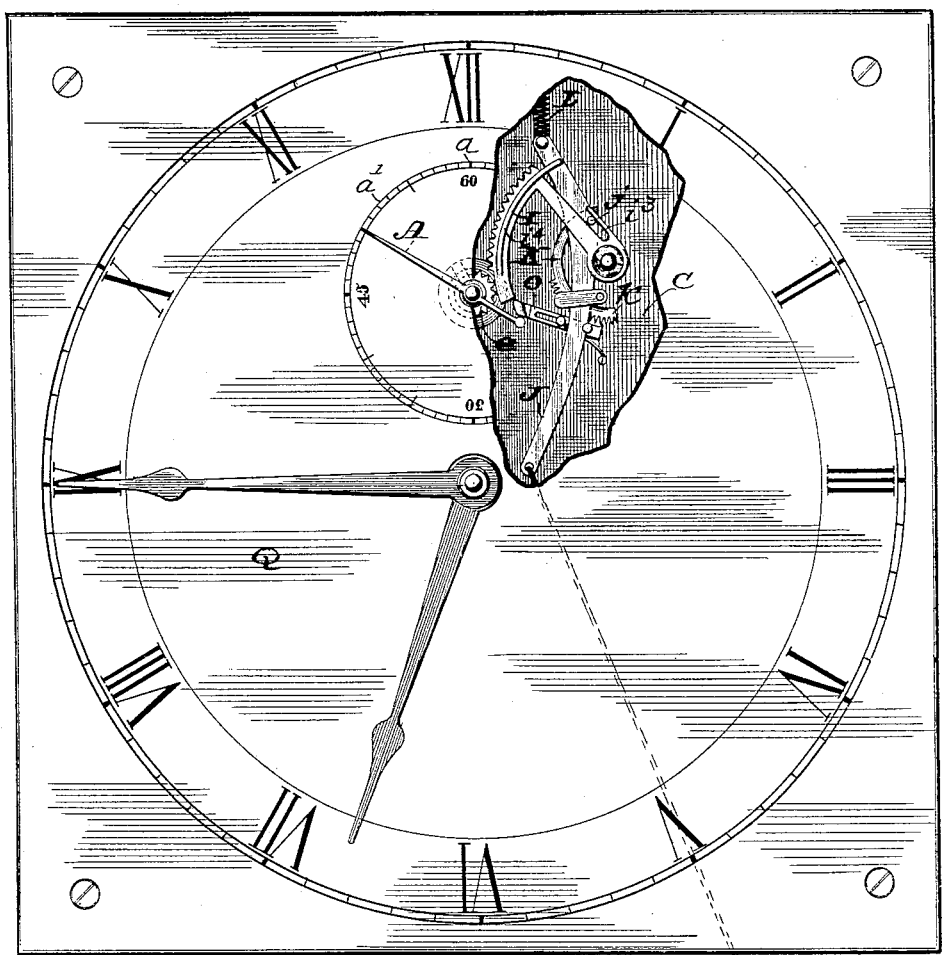
Figure 1:
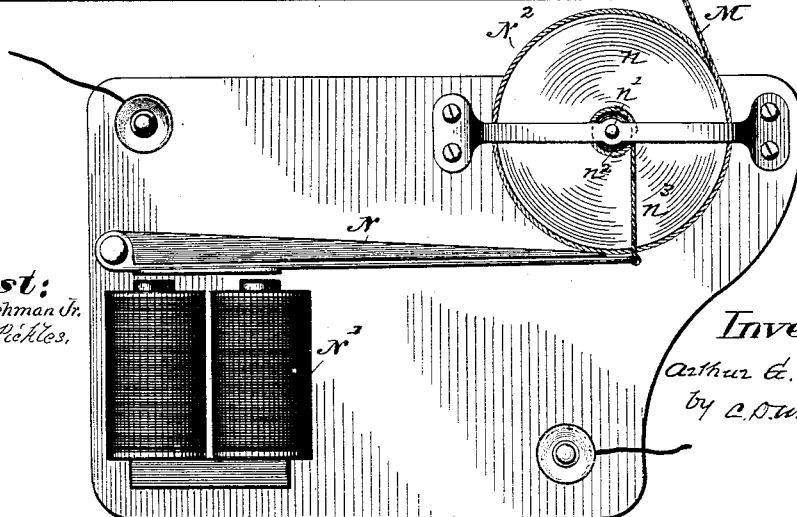

Figure 1 is a face view of a clock in which the improvement is embodied, a portion of the dial-plate being broken away to exhibit the mechanism special to the improvement; Figs. 2, 3, and 4, views similar to that of Fig. 1, and showing, respectively, the successive positions assumed by the parts of the mechanism used in operating the seconds-hand; Fig. 5, a section on the line 5 5 of Fig. 3; Fig. 6, a section on the line 6 6 of Fig. 2; Fig. 7, a section on the line 7 7 of Fig. 3; Fig. 8, a section on the line 8 8 of Fig. 3; and Fig. 9, a cross-section through the seconds-hand shaft without or above the part used to disengage the rack from the seconds-hand shaft pinion.

The views are upon various scales, and the same letters of reference denote the same parts.

A leading feature of the improvement is the means immediately employed to effect the rotation of the seconds-hand A, Figs. 1 and 5.

B represents the customary seconds-hand shaft or post journaled in the main plate C, as is usual.

D represents a sleeve upon the shaft B and having at its inner end the disk $d$.

E represents an outer sleeve upon the sleeve D and provided with a pinion, $e$. A spring-washer, F, is interposed between the pinion $e$ and the disk $d$, as shown.

G represents an arm applied to the sleeve E, and the seconds-hand is also applied to the sleeve E, substantially as shown. The nut H secures the sleeve E longitudinally in place. When that part of the mechanism which belongs to the improvement is not in operation, the shaft B serves to carry the seconds-hand around in the usual manner; but the sleeve E and pinion $e$, by applying a force thereto sufficient to overcome the friction of the sleeve E upon the sleeve D, can be rotated upon the sleeve D, and when it is so rotated the pinion and sleeve E carry the arm G and the seconds-hand A around with them, and it is by thus carrying the seconds-hand around with the sleeve E until the arm G encounters a stop, as presently described, that the synchronization of the seconds-hand is effected. This movement of the seconds-hand and arm is accomplished preferably in the following manner.

I represents a rack adapted to engage with the pinion and to be moved past it, and thereby impart a rotation to the pinion. The rack is curved, and by means of the arm $i$ it is pivoted at $i'$ to a post, $i^2$, secured in the main plate C, Fig. 6, and the rack can be turned on its pivot $i'$, as indicated by its positions shown respectively in Figs. 2, 3, and 4. The preferable means for thus moving the rack are as follows:

J represents a lever pivoted at $j$ to an arm, K, which in turn is pivoted at $i'$ to the post $i^2$. The lever thus pivoted can be moved to and fro substantially as is indicated by the different positions of the lever in the different figures of the drawings. The spring L, fastened at one end, $l$, to the main plate C, and at the other end, $l'$, to the lever, serves to draw the lever upward, as viewed in the drawings, and by means of the connection M, which may be a cord leading to an armature, N, of a magnet, N', Fig. 1, the lever can be drawn downward. The lever J is provided with a projection, which may be an extension outward of the pivot $j$, which is adapted to engage in such a manner with the rack I as to enable the lever, when drawn downward, as described, to draw the rack around and downward, and when drawn upward to move the rack around upward. To this end the rack-arm $i$ is slotted at $i^3$ to receive the projection $j$. The rack is provided with a shoulder in the form of an outwardly-projecting flange, $i^4$, which extends along the rack, substantially as shown.

The operation of the parts as thus far described is as follows: Suppose the clock represented to be in an electric circuit containing the magnet N' and armature N. When the armature moves toward the magnet, it draws the cord M with it, and the lever J in consequence is drawn downward. The movement of the armature may be multiplied, if desired, by means of any suitable device—for instance, that shown at $N^2$, Fig. 1—that is, the connection M, instead of connecting directly with the armature, may be carried around and fastened to the periphery of the drum $n$, which is journaled at $n'$ and provided with a hub, $n^2$, and another connection, $n^3$, may lead from the armature to around the hub, by which means the movement is multiplied according to the ratio between the diameter of the hub $n^2$ and that of the drum $n$. When the lever J is drawn downward, the rack I, as stated, is drawn with it. The lever J has virtually two motions. It, in its downward movement, first turns on its pivot until it assumes the position of Fig. 2, and it then moves longitudinally against the resistance of the spring L. The initial position is shown in Fig. 2. The rack moves downward and becomes engaged with the pinion $g$, as shown in Fig. 3. The continued downward movement of the rack causes the pinion $e$ to rotate until the arm G encounters the shoulder $i^4$ upon the rack I. This movement effects the regulation of the seconds-hand, for the particular quarter to which the arm G points when it encounters the shoulder $i^4$ is always the same, and whether the rack is drawn wholly or partly down, the arm turns to point in the same direction; hence, whether the seconds-hand is fifty-nine seconds out or is only one second out, it will always be carried around to the mark predetermined upon—for instance, the sixty-seconds mark $a$ upon the seconds-hand graduation $a'$; but when the lever J is released it must, as well as the rack I, be restored to its original position without turning the seconds-hand backward or even disturbing it. To this end the rack, after completing its downward stroke, must be disengaged from the pinion $e$. This is done by removing the rack from the plane of the pinion. The rack, by making its arm $i$ thin, as shown in Fig. 7, is adapted to be sprung upward and outward, so that it does not engage with the pinion, and this disengaging movement of the rack is effected, preferably, by means of a wedge, O, which is adapted to be slipped beneath the rack, and thereby to pry it upward. The wedge is slotted to receive and to be moved upon a guide-pin, $o$, and the movement of the wedge forward to bring its point $o'$ beneath the rack and backward to withdraw its point out of the way of the rack is accomplished as follows: The wedge is provided with two pins, $o^2$ $o^2$, which come respectively against the opposite edges of the lever J. The lever J is shaped substantially as shown, and it is also drawn, so that when it is moved downward it operates to shift the wedge to the left, as seen in the drawings, and to cause its point to be wedged beneath the rack, as shown in Fig. 4. The rack is now disengaged, and on releasing the lever the rack, through the action of the spring, is moved into its original position. (Shown in Fig. 2.) The lever J as it returns to its original position first turns on its pivot in a direction contrary to that in which it turned when it was being moved downward, and it is then moved longitudinally with the spring F. It is important, to secure better results, that the rack be entirely free of the pinion before any force is brought to bear upon the rack to return it to its original position, as otherwise the pinion, and with it the seconds-hand, is liable to be turned around in a backward direction. To this end the rack and the lever are so relatively contrived that after the lever has ceased to exert its force upon the rack in moving it downward an interval of time occurs before the lever can act upon the rack to move it in the opposite direction. During this interval the rack is disengaged from the pinion in the manner described. The most desirable means for accomplishing this is as follows: The slot $i^3$, opposite the projection $j$, is widened, substantially as shown, to a width greater than the diameter of the projection, by which means the projection is prevented from bearing upward against the rack until it has crossed the slot. The lever J, in the manner described, is sufficient for moving the wedge O longitudinally—that is, by reason of the lever passing between shoulders, such as the pins $o^2$ $o^2$ upon the wedge, the wedge is moved toward and from the rack as the lever is moved upward and downward, as described, and the construction is such that during the downward movement of the rack, and until it is necessary to lift the rack out of engagement with the pinion, the wedge is withdrawn out of the field of the rack. If any auxiliary means is needed for moving the wedge into engagement with the rack, as described, the curved rack $k$, which forms an extension of the arm K, may be employed, as follows: The wedge O is provided with a projection, $o^5$, which is adapted to, and does, engage with the rack $k$ when the wedge is to be moved beneath the rack, and the wedge is thereby moved longitudinally toward the rack. As the point of the wedge encounters the disk $d$, it is thereby deflected, as shown in Fig. 9, until it encounters the stop P, and the projection $o^5$ is thereby disengaged from the rack $k$, leaving that part free to be moved independently of the wedge. The stop P in effect is a shoulder affixed to the plate C and in a position to prevent the point of the wedge from being deflected only far enough to effect the disengagement of the projection $o^5$. A spring, $o^{10}$, may be used to hold the wedge better in place. The point $o'$ of the wedge is beveled, as shown in Fig. 9.

Q represents the dial-plate of the clock.

R represents a guide for the lever J.

I claim—

1. The combination of the seconds-hand pinion and the rack I, said rack being attached to an arm and capable of being moved into and out of the plane of the pinion, as described.

2. The combination of the seconds-hand A, the shaft B, the sleeve D, the sleeve E, the pinion e, and the rack I, as and for the purpose described.

3. The combination of the shaft B, the sleeves D E, the pinion e, the rack I, the shoulder $i^4$, and the arm G, substantially as described.

4. The combination of the plate C, the shaft B, the sleeves D E, the disk d, the pinion e, the washer F, the arm G, the hand A, the rack I, and the shoulder $i^4$, substantially as described.

5. The combination of the pivoted rack I, the plate C, the spring L, the pivoted arm K, the connection M, the pivoted lever J, and the seconds-hand pinion, said rack being adjustable into and out of the plane of the pinion, substantially as described.

6. The combination of the pinion e, the rack I, the slotted arm i, the pivoted lever J, and the projection j, substantially as described.

7. The combination of the pivoted arm i, the lever J, and the pin j, said arm having the slot $i^3$ widened, as described, and for the purpose set forth.

8. The combination, in a clock, of the rotating arm G and the movable rack I, having a shoulder, $i^4$, for the arm to encounter in its rotation, substantially as described.

9. The combination of the pinion e, the rack I, and the wedge O, said wedge being movable beneath said rack at the end of its downward stroke to disengage the rack from the pinion, substantially as described.

10. The combination of the pinion e, the pivoted rack I, the lever J, and the wedge O, substantially as described.

11. The combination of the lever J, the arm K, the rack k, and the wedge O, having the projection $o^3$, substantially as described.

12. The combination of the disk d, the beveled wedge O, the pivoted rack, the lever J, and the stop P, substantially as described.

13. The combination of the journaled pinion e, the rack I, the spring-arm i, the shoulder $i^4$, the journaled arm G, the lever J, and the pivoted arm K, substantially as described.

14. The combination of the armature and magnet, the connection M, the pivoted lever J, the pivoted arm K, the pivoted rack I, and the seconds-hand pinion, said rack being adjustable into and out of the plane of the pinion, and the spring L, substantially as and for the purpose described.

Witness my hand this 19th day of May, 1888.

ARTHUR G. WISEMAN.

Witnesses:
C. D. MOODY,
A. M. EVERIST.